United States Patent [19]
Iwahori et al.

[11] 3,873,034
[45] Mar. 25, 1975

[54] APPARATUS FOR PRODUCING SYNTHETIC PULP

[75] Inventors: Eitaro Iwahori, Narashinoshi; Mitsuo Kurita, Yokohamashi; Mitsumasa Uno, Ichiharashi, all of Japan

[73] Assignee: Chisso Corporation, Osaka, Japan

[22] Filed: Aug. 17, 1973

[21] Appl. No.: 389,408

Related U.S. Application Data

[60] Division of Ser. No. 362,580, May 21, 1973, which is a continuation-in-part of Ser. No. 209,778, Dec. 20, 1971, abandoned.

[52] U.S. Cl. .................................. 241/55, 241/56
[51] Int. Cl. ..................... B02c 13/10, B02c 13/288
[58] Field of Search .................... 241/55, 56, 186 R

[56] References Cited
UNITED STATES PATENTS
3,610,542  10/1971  Yamagishi ..................... 241/56 X
3,622,086  11/1971  Yamagishi ..................... 241/56 X Primary Examiner—Roy Lake
Assistant Examiner—E. F. Desmond
Attorney, Agent, or Firm—Fred Philpitt

[57] ABSTRACT

An apparatus for fibrillating a synthetic resin film which includes a casing, at least two rotors in the casing, and a space between said rotors. A suitable apparatus for such fibrillation is presented. Synthetic pulp thus prepared provides a paper-like material having superior properties by blending it with e.g., wood pulp.

3 Claims, 10 Drawing Figures

APPARATUS FOR PRODUCING SYNTHETIC PULP

This application is a divisional application of U.S. Ser. No. 362,580 filed on May 21, 1973 which is a continuation in part of Ser. No. 209,778, filed Dec. 20, 1971, now abandoned.

DESCRIPTION OF THE INVENTION

This invention relates to an apparatus for producing synthetic pulp having a proper crimpability, good fibril-form, fine deniers, good quality and good paper-making ability. More particularly, the present invention relates to an apparatus for efficiently producing synthetic pulp having said properties from polypropylene resins as a starting material.

Heretofore, light, soft and bulky papers having a good permeability based on polyolefin fibers have been known, but they are prepared (1) by blending ordinary polyolefin fibers alone, obtained by ordinary spinning or blending them with other fibers, (2) by blending crimped spun fibers alone or blending them with other fibers, (3) by making papers from conjugated fibers obtained by spinning resins having different melting points as raw materials and heating the papers thereby to effect shrinkage and make the papers highly bulky, or (4) by entangling other fibers than the polyolefin fibers, for example, fibers capable of being readily fibrillated, such as acrylic fibers, with one another, while repressing fluffing on the surface of paper thereby to increase the strength of paper.

The thus prepared papers are called "light weight paper", "soft paper", "highly bulky paper" or "paper having a good permeability", as compared with the ordinary paper of cellulose fibers, and these papers can be conveniently evaluated from the viewpoints of low weight per thickness, rigidity per thickness, apparent density and high degree of air permeability.

However, the papers prepared by said methods (1) and (3) can be improved insofar as light weight, softness, bulkiness and permeability as the blending ratio of the polyolefin fibers is increased, whereas as disadvantages the polyolefin fibers are liable to float over the water surface at the time of making the papers, and fluffs are noticeable on the paper surface. To prevent these disadvantages, a large amount of a fibrous binder, resin binder, etc. must be used, but as a result, the light weight, softness, bulkiness and permeability are reduced. This is another disadvantage of said prior art methods.

On the other hand, in the method (2) based on the use of crimped fibers, a bulky paper is prepared utilizing the high porosity of entangled crimped fibers, but the highly crimped fibers are liable to form flocks by mutual entanglement under the ordinary paper-making conditions, and the paper-making efficiency is greatly reduced. Therefore, there is a limit to the degree of crimping of the fibers.

In the method (4) based on blending fibrillation-susceptible fibers, such as acrylic fibers, alone, or together with other fibers, after beating, fluffing can be repressed, but the specific gravity of the fibers is larger than that of the polyolefin fibers, and also a snake-like fiber form is hardly obtainable. Thus, a particularly light weight paper cannot be obtained, and also the bulkiness cannot be attained.

An object of the present invention is to provide an apparatus for producing synthetic pulps having quite different forms from those of the pulp materials obtained from spun fibers, from a polypropylene resin composition.

Another object of the present invention is to provide an apparatus for producing synthetic pulps having the following characteristics:

a. Fibrils being branched in a developed manner from a trunk.

b. The trunks and fibrils having acutely angular broken surfaces.

c. The trunks and fibrils being extended in various large and small crimps or snake-like forms along the longitudinal direction thereof.

d. The sizes of the trunks substantially never exceeding 20 deniers and most of the sizes being less than 5 deniers.

e. As the sizes of the trunks are increased, the width being increased as compared with the thickness.

f. The lengths of the trunks being less than 5 mm, preferably 4 mm, and the trunks having substantially uniform fiber lengths at a given length.

g. Substantial absence of powders or short fibers having sizes as close as those of powders.

h. In each pulp, the fibers being slightly entangled with one another, when collected.

i. Each pulp being never formed into a small twisted mass by firm entanglement of the fibers, and containing no molten small particles.

Particularly, the formation of powders must be avoided, because the powders float over the water at the time of paper making and foul the wires. Further, the formation of unfibrillated, large-size materials, small twisted materials, and molten small particles must be avoided, because they impair the quality of paper and cause cloggings of wires.

In addition to and in connection with the above-mentioned objects, a further object of the present invention is to provide an apparatus for producing a synthetic pulp which exhibits a superior initial water-wettability. When the pulp whose total surface area is coated with a surfactant in at least an overwhelming ratio, is subjected to a dispersing or mixing means such as pulper, beater, etc. which are used in the field of paper-manufacturing industry, the above-mentioned superior initial water-wettability of the pulp makes the operation easy and also reduces the amount of floating fine pulp, whereby paper-making process can be carried out in a much preferable manner.

Still further objects of the present invention will be evident from the description which follows.

The raw materials, surfactants, etc. to be used in the preparation of the synthetic pulp having the above-mentioned properties will be illustrated in the part of the preparation hereinafter described. An example of the shapes of the resulting synthetic pulp is shown in FIG. 4 of the accompanying drawings.

The production of synthetic pulps of the present invention consists essentially of cutting a uniaxially stretched material of polypropylene composition to a desired length and then fibrillating the resulting cut, uniaxially stretched materials.

To attain the objects of the present invention, problems inherent in the polypropylene composition, the shape and stretching method of the uniaxially stretched materials, the method for cutting the stretched materials, to a desired length, and the method for fibrillating the materials must be solved each, and all these problems must be unified.

The present inventors have found that these problems can be solved in the following manner:

i. Polypropylene composition: the use of a mixture of 50 to 90 parts by weight of polypropylene having a melt flow rate (which is measured at 230°C and under a load of 2.16 kg and will be hereinafter abbreviated to "MFR") of 30 to 150, and 50 to 10 parts by weight of low density polyethylene.

ii. Shape of the uniaxially stretched material and its stretch-method: uniaxially stretching a film having a shapable thickness of $70\mu$ or less, in an allowable stretching ratio of 8 times or more the original length.

iii. Method for cutting the stretched material to a desired length: cutting the film to a length of 5 mm or less.

iv. Method for fibrillating the cut film: fibrillation by crumpling and disintegrating mainly by blow and air whirling stream.

In the present invention, it is necessary to use a polypropylene having a considerably higher MFR, as compared with those for the ordinary molding. When MFR is lower than 30, the fibrillated materials become coarse and the objects of the present invention cannot be successfully accomplished. On the other hand, when MFR exceeds 150, the fibrillated materials become fine and this is desirable, but they are liable to cause drawdown at the time of film forming. Thus, such is not desirable from the viewpoint of film-forming operation. Particularly desirable range of MFR, in view of the properties and preparation of good fibrillated materials, is 40 to 80. A mixture containing polypropylene having different MFR can be used, so long as such will not bring about any operational trouble such as breakage at the time of stretching accompanied by fish eyes.

Such polypropylene having a high MFR can be readily prepared by increasing the amount of hydrogen present in the reaction according to the ordinary polymerization method using a Ziegler type catalyst. Alternatively, it can be obtained by heat-deteriorating a polypropylene having a low MFR. However, the former method is preferable on account of the film stability.

There is no particular limitation to the low density polyethylene used together with the polypropylene. Usually, the low density polyethylene having a melt index (which is measured at 190°C and under a load of 2.16 kg and will be hereinafter abbreviated as "MI") of 0.5 to 10 is sufficient. When MI is low, the fibrillated materials are liable to become coarse, and on the other hand, when MI is high, the fibrillated materials become fine. It is particularly desirable on account of the requirement of the cutting to 5 mm or less, as will be described later, that MI be about 1.0 to 3.0.

Preferable mixing ratio of polypropylene to polyethylene is 50 – 90:50 – 10 parts by weight. When less than 10 parts by weight of polyethylene is used, the drawdown is liable to take place at the time of film forming, and the stretchability of the film becomes poor. Further, the content of powders formed in the fibrillated materials is increased. On the contrary, when more than 50 parts by weight of polythylene is used, the fibrillated materials become coarse and such is not desirable. Generally, the most suitable ratio of polypropylene to polyethylene is 70 – 85:30 – 15 parts by weight.

Pigment, dye, wetting agent or other additives can be added to the present polypropylene composition, if necessary.

Next, said polypropylene composition must be shaped into a film having an allowable thickness of $70\mu$ or less.

When the film has a thickness of more than $70\mu$, the fibrillating step must be more intensified than necessary, and the fibrillated materials become coarse, and have undesirably uneven deniers. On the other hand, too thin film is desirable from the viewpoint that the fibrillated materials become fine, but is not desirable from the viewpoint of the production efficiency. Therefore, the most suitable thickness of the film is generally 30 to $60\mu$.

There is no particular limitation to the molding method. That is, air-cooling inflation method, water-cooling inflation method, T-die method, etc. can be applied in the present invention.

The thus prepared film is successively stretched in an allowable range of stretching ratio of 8 times or more the original length. It is almost impossible to uniaxially stretch a film obtained from the ordinary molding-purpose polypropylene having MFR of 10 or less, 8 times or more as long as the original length. Particularly, the stretching is quite impossible in the commercial operation. On the other hand, in the present invention, the film obtained from the present polypropylene composition can be readily stretched to about 13 times by properly selecting the stretching conditions.

The ease of fibrillating can be increased with the stretching ratio, but the productivity is, on the other hand, decreased therewith. Therefore, in view of the quality and the productivity of the fibrillated materials, the most suitable stretching ratio is 10 to 13 times.

Within this range of stretching ratio, it is possible to readily stretch a tubular film having a monolayer film thickness of $50\mu$ and a folded diameter of 500 mm with a high speed of 200 m/min. or more in a stretching ratio of 10 times or more.

As for the heating method at the time of stretching, any of the well-known methods, for example, the methods based on heated air atmosphere, heating roll, heating plate, infrared radiation, steam atmosphere, etc. can be used, but the most stable operation can be attained when the film is stretched in the heated air atmosphere. Preferable stretching temperature is 120° to 150°C.

The film thus uniaxially stretched at a stretching ratio of 8 times or more is very susceptible to longitudinal splitting. For example, when the film is lightly crumpled with the finger tips, the crumpled portions immediately become dark white owing to a diffused reflection. This means an occurrence of fine splitting.

After the stretching, the film or tape is led to the successive cutting step. Cutting must be effected to the desired length of 5 mm or less. When the cut length is more than 5 mm, the operation becomes impossible in the fibrillating step owing to the melting and agglomeration. Even if the operation is possible, molten particles having sizes similar to those of sand particles, slightly twisted or pilled masses of particles are formed, and undesirably impair the quality of the fibrillated materials.

Particularly preferable cut length for smooth operation is 4 mm or less.

It is impossible to cut the film to such a desired length directly after the stretching, because the running speed of the film just after the stretching is high, for example, 100 m/min. or higher. Therefore, in the actual operation, the stretched film is once wound up onto a bobin or the like, and the wound up stretched film must be cut, after a plurality of the films have been assembled together, by a cutting means such as a guillotine-type cutter. According to said method, the wound stretched film must be unwound for the cutting, but at this time, the stretched film sometimes undergoes longitudinal splitting, and the unwinding may become impossible to continue due to fluffing. However, such a difficulty can be avoided in the present invention by using a low density polyethylene having a MI of 1.0 to 3.0 as one of the starting materials. That is to say, the stretched film prepared from the composition containing the low density polyethylene having a MI in such a range undergoes no longitudinal splitting even at the time of unwinding, but still has a very good fibrillating ability.

The stretched film is cut to 5 mm or less, preferably to 4 mm or less and the resulting cut films are led to the subsequent fibrillating step. The fibrillating step comprises a fibrillating zone consisting mainly of crumpling and disintegrating actions by blow and air eddy. An example of the apparatus suitable for establishing a desirable state for such a fibrillating zone will be illustrated later.

At the time of the fibrillation, there occurs a temperature rise in the fibrillating zone. In order to abate it, various means as follows can be optionally taken in case of necessity:

Attachment in advance, of water to the material to be fibrillated or supply of a suitable amount of water into the fibrillating zone thereby to prevent an excessive temperature rise through the latent heat of vaporization of water; or cooling by means of a cooling medium passed through e.g. a jacket in a casing provided outside the fibrillating zone.

A pulp whose total surface is coated with a surfactant in at least an overwhelming ratio, can be obtained by carrying out the fibrillation in the presence of the surfactant. In this case, if the fibrillation is carried out under dropping of a dilute solution of the surfactant, the total surface of the pulp can be uniformly coated with the surfactant, and also, the temperature rise due to the fibrillation can be abated through the latent heat of vaporization of water. Further, synthetic pulp having the above-mentioned various specific properties can be thereby produced very smoothly and with a good efficiency.

As for the surfactants to be used in the present invention, any of anionic, nonionic or cationic type surfactants can be used. Among them, dialkyl sulfosuccinates or their salts, such as dioctyl sulfosuccinate or its sodium salt, having advantages of a superior wettability and less foaming at the time of paper-making, are particularly preferable. Ethers of polyoxyethylene such as polyoxyethylene lauryl ether, polyoxyethylene nonyl phenyl ether, etc. also can be preferably used although these ethers are slightly inferior in effectiveness to the above-mentioned sulfosuccinates.

Together with these surfactants, dispersing agents for improving dispersibility in water, of the synthetic pulp materials, such as an adduct of polypropylene glycol and polyethylene oxide, are made coexistent, if necessary. As for such an adduct, those consisting of polypropylene glycol having a molecular weight of 1,000 – 3,000, preferably about 2,000, and polyethylene oxide whose addition amount is 5 – 50 times, preferably about 20 times, the weight of the polypropylene, are preferable.

Further, a defoaming agent can be made coexistent therewith, if necessary.

In addition to these, other various kinds of additives can be optionally added under the condition that no trouble occurs in the manufacturing operation.

The surfactants can be used generally in the form of a dilute aqueous solution.

In order to achieve a stabilized operation, it is preferable to use a dilute aqueous solution thereof in an amount of 0.1 – 0.4 l/Kg, preferably 0.15 – 0.2 l/Kg, based upon the fed amount by weight of the material to be fibrillated. If the amount used is less than 0.1 l/Kg, effectiveness can be hardly attained. If the amount exceeds 0.4 l/Kg, the amount of water fed becomes too much over the necessary amount, and in some case, the dilute aqueous solution stays in the fibrillator, whereby desirable operation becomes difficult. The concentration of the surfactant in the dilute aqueous solution can be selected within a broad range, in accordance with the desired degree of wettability of the resulting synthetic pulp. Generally, the concentration within the range of 0.5 – 3.0% by weight, preferably 1.0 – 2.0% by weight, is suitable. More particularly, if it is desirable to attach the surfactant thereto in a relatively low concentration to such an extent that, when the material of synthetic pulp is thrown into water, a slight stirring is necessary for wetting the whole of the material, the range of 1.0 – 1.5% by weight is suitable, while, if it is desirable to attach the surfactant thereto in a relatively high concentration to such an extent that, when the material is thrown into water, the material sinks in water voluntarily and hence no stirring is necessary, the range of 1.5 – 2.0% by weight is suitable.

As an illustrative example of apparatuses suitable for establishing a desirable state for the fibrillating zone as mentioned above, the following whirling stream type fibrillating machine having a particularly designed construction is shown.

That is an air whirling stream type fibrillating machine which comprises a cylindrical outer casing having an inlet for supplying materials to be fibrillated and air on one side and an outlet for discharging an air stream containing fibrillated materials on the other side; a plurality of linear projections on the inner peripheral surface of said casing, projected radially towards the center line of said casing from the surface; a rotary shaft capable of being revolved at a high speed around the center line of said casing; a plurality of rotors spaced from each other and each consisting of a disk fixed perpendicularly to said rotary shaft, and a large number of vanes spaced from each other and fixed onto the periphery of said disk and in parallel to said center line and having small clearances between the tips of said vanes and said linear projections of said outer casing; pairs of circular plates fixed to said rotary shaft in such a way that each of said pairs supports each of said rotors therebetween on both the sides of said rotors in the direction of said rotary shaft and having a smaller diameter than those of said rotors; and a vane wheel for sucking the materials to be fibrillated and air and discharging the air stream containing the fibrillated materials, consisting of a disk fixed perpendicularly to said rotary shaft and adjacent to a circular plate nearest to said inlet among said circular plates for supporting said rotors, and a large number of vanes provided thereon in the radial direction.

Now, the present invention will be explained, referring to the accompanying drawings illustrating one embodiment of the present invention.

Figure 6:
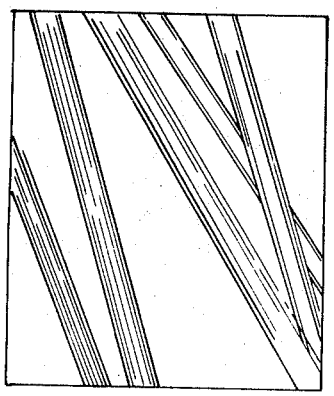
Figure 7:
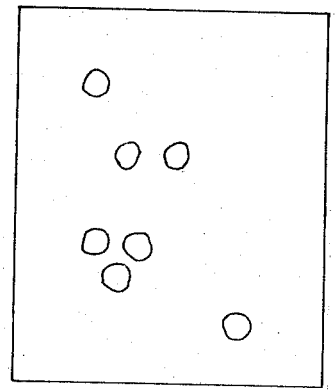
Figure 8:
Figure 9:
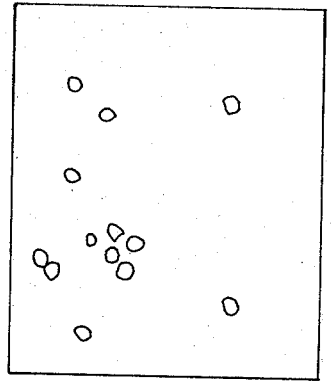

FIGS. 6 to 9 are views for comparison. FIG. 6 is an enlarged plan view of well-known spun polypropylene fibers. FIG. 7 is an enlarged, laterally cross-sectional view of the fibers of FIG. 6. FIG. 8 is an enlarged plan view of well-known fibrillated acrylic fibers. FIG. 9 is an enlarged, laterally cross-sectional view of the fibers of FIG. 8.

Figure 10:
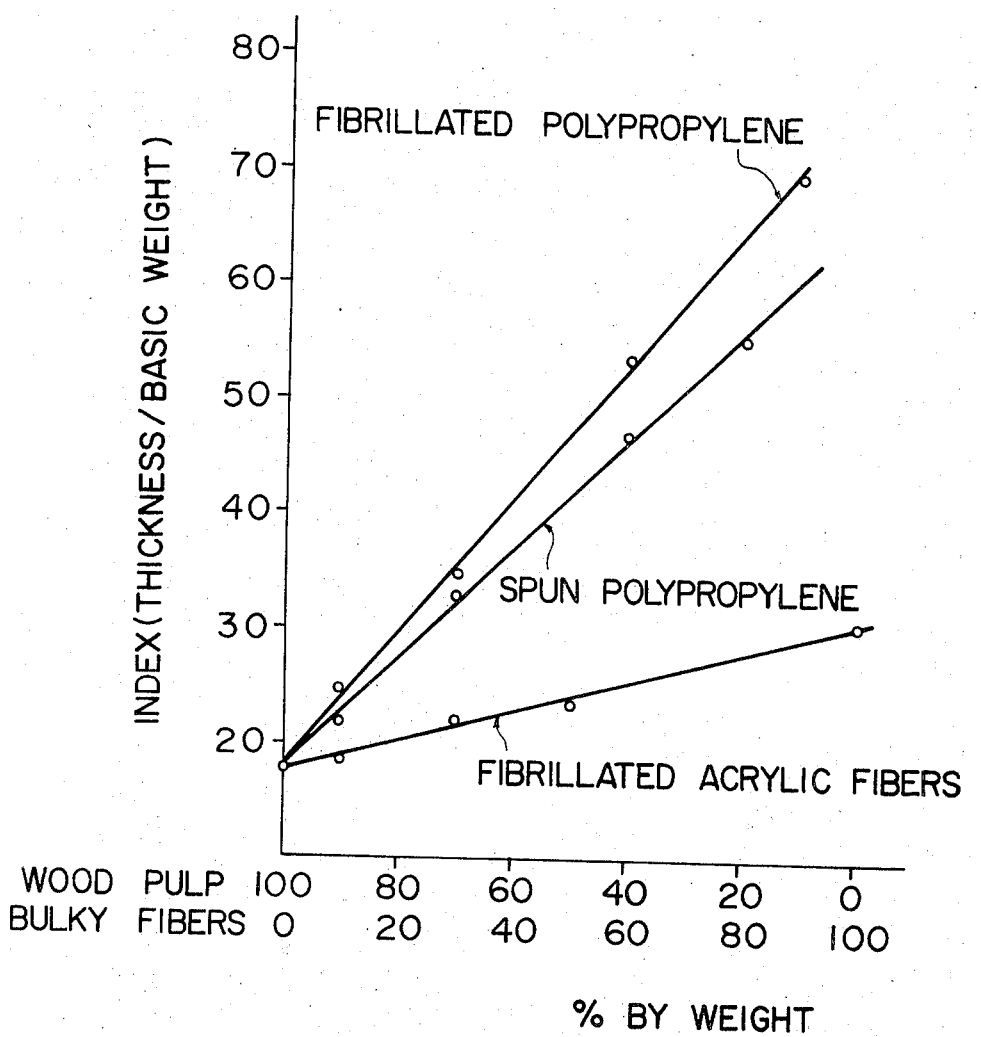

FIG. 10 is a graph showing the relationship between the thickness/basic weight ratio and the composition of various fibers.

Figure 1:
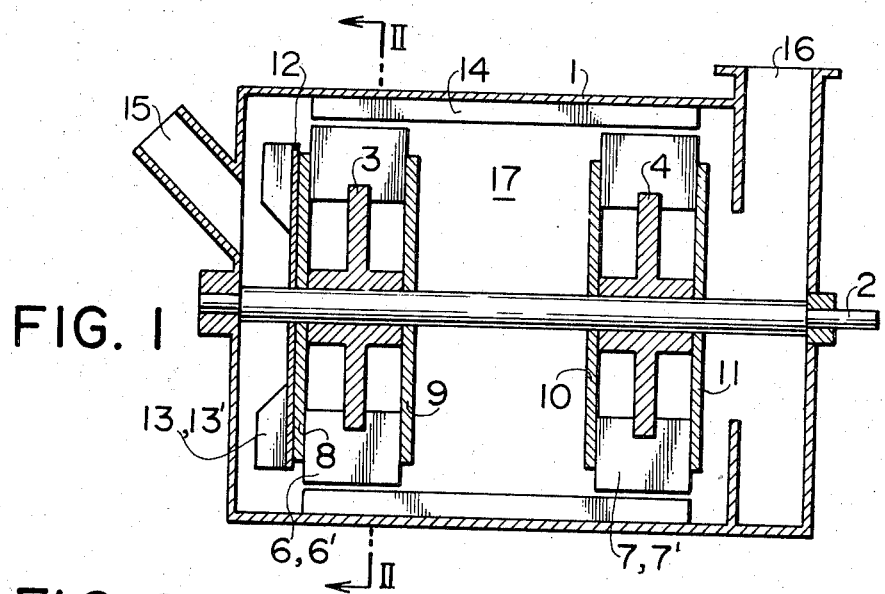
FIG. 1 is a vertical cross-sectional view of one embodiment of the fibrillating machine preferably used in the present invention.
Figure 2:
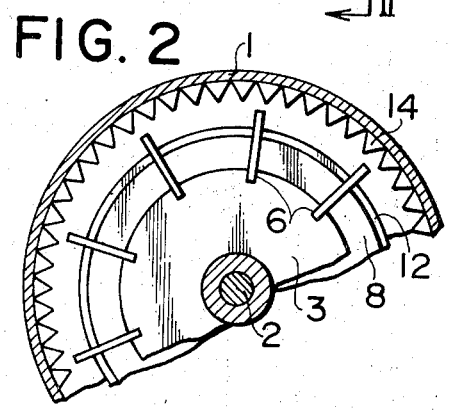
FIG. 2 is a cross-sectional view in part of the machine of FIG. 1 along the line II — II thereof.
Figure 3:
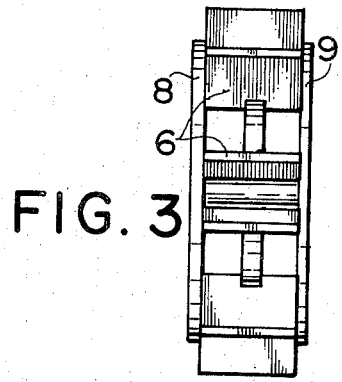
FIG. 3 is a developed view of the outer periphery of a set of vanes in FIG. 1.

In FIG. 1, numeral 1 is a cylindrical outer casing having on one side, an inlet 15 for supplying materials to be fibrillated and air, and on the other side, an outlet 16 for discharging an air stream containing fibrillated materials, and provided with a large number of linear projections 14 on the inner peripheral surface of the casing, projected radially towards the center line of the casing from the peripheral surface.

Numeral 2 is a rotary shaft capable of being revolved at a high speed, and is on the center line of the outer casing 1. Numerals 3 and 4 are disks perpendicularly fixed to the rotary shaft 2, and vane 6 or 7 are fixed in parallel to said center line (or rotary shaft) and on the outer periphery of the disk 3 or 4. The vane 6 or 7 may be generally square or rectangular plates. There is provided a small clearance, for example, 3 to 10 mm, preferably 4 to 6 mm between the tip ends of the vanes, that is, the edges of vanes facing the inner periphery of the outer casing and the linear projections provided on the inner periphery of the outer casing.

The disk 3 is provided with a large number of the vanes 6 to form a roter 6', and likewise the disk 4 is formed into a roter 7'.

The rotor 6' or 7' is sandwiched with both disks 8 and 9 or both disks 10 and 11 fixed on the rotary shaft and in front and rear of the rotor in the direction of the rotary shaft. Thus, the outer periphery of the rotor has a ladder structure.

Said disks 8, 9, 10 and 11 must have smaller diameters than that of the rotor. Numeral 13' is a vane wheel consisting of a disk fixed perpendicularly to said rotary shaft and adjacent to a disk 12 nearest to said supply inlet 15 among the disks for supporting the rotors, and a large number of vanes 13 provided on the nearest disk in the radial direction.

Numeral 17 is a space for isolating the rotors 6' and 7'. The materials to be fibrillated, are sucked together with air from the inlet 15 by the action of the vane wheel 13', dispersed by whirling action of the vane wheel 13', led to the clearance part between the inner peripheral surface of the outer casing and the tip ends of the vanes at the rotor, beaten by the tip ends of the vanes 6, repulsed by the linear projections 14, crumpled and disintegrated by an action of vigorous air whirling stream generated in a compartment enclosed by the vanes 6 and the disks 8 and 9, etc. and then conveyed to the space 17 by an air stream flowing from the inlet 15 towards the outlet 16. The materials are once retained in the space or passed through the space without being retained, and led to another clearance between the inner peripheral surface of the outer casing and the tips of the vanes at the rotor 7', and are likewise further fibrillated by the actions of blow, repulsing, and air whirling stream. Then, the fibrillated materials are discharged from the outlet 16 and caught by a cyclone or the like, and then again subjected to the similar treatment by means of the same fibrillating machine.

As an illustrative embodiment for carrying out the fibrillation in the presence of a surfactant, a pipe for supplying a solution of surfactant is connected to the above-mentioned supplying inlet 15, whereby a dilute solution of surfactant is supplied into the fibrillating machine. It is desirable that the tip end of the pipe be projected by a small distance from the end part of the inner side of the supplying inlet 15 toward the inside of the fibrillating machine, whereby the solution of surfactant, immediately after having left the pipe, forms a spray due to the stirring action of the vanes and is uniformly dispersed. When a plurality of fibrillating machines in series are used, said pipe can be properly provided in the first or the second or the subsequent machines.

Next, desirable operation conditions for the above-mentioned fibrillating machine will be illustrated hereunder.

It is desirable that the rotating speed of the tip ends of the rotor be within 92 to 110 m/sec. When the rotating speed is less than 92 m/sec, the fibrillated materials become coarse, which is undesirable. When the rotating speed is more than 100 m/sec, the fibrillated materials become fine, which is desirable, but there is an operational danger. The most suitable rotating speed is 100 to 105 m/sec.

Further, it is desirable that the ratio of the discharged air rate per the inner diameter of the outer casing be 25 to 50 $m^3$/m·min. When the ratio of the discharged air rate per the inner diameter of the outer casing is less than 25 $m^3$/m·min, the fibrillated materials become fine, and are desirable, but the materials to be fibrillated clog in the machine and melt. Thus, there is a danger of the inoperability. On the other hand, when the ratio exceeds 50 $m^3$/m·min, the fibrillated materials become too coarse, which is not desirable.

Further, it is preferable that the materials to be fibrillated be charged into the machine at such a rate per the inner diameter of the outer casing as 150 kg/m·hr or less. That is, when the rate is more than 150 kg/m·hr, the fibrillated materials become coarse and further there is a danger of clogging in the machine.

The reasons why the synthetic pulp having said distinguished characteristics can be obtained according to the present invention will be clear from the following description.

That is, the materials to be fibrillated undergo only crumpling and disintegrating actions mainly by the blow and air whirling stream, and never undergo strong mechanical actions such as cutting, pressing friction, scratching, etc. as encountered in the ordinary beater for making paper. Thus, no powders are formed at all, or short fibers having sizes approximate to those of powders are not substantially formed. Furthermore, no fibers are firmly entangled with one another, or twisted at all, or no molten small particles are formed by partial heat generation.

Further, the materials to be fibrillated undergo mild and uniform fibrillation action, as compared with the mechanical fibrillation action, and thus the resulting fibrillated materials have a uniformity in sizes and lengths. The fibrillated materials are split in a torn state along the stretching direction of the stretched film, and are comparatively rarely split in a layer state along the direction of thickness. In the present invention, the materials to be fibrillated are thin stretched films, and therefore, even if the so-called short-pass materials with a small degree of fibrillation are formed, such takes a scale-like shape, and thus the entire volume is not so much increased. Generally, such scale-like materials never exceed 20 deniers.

The fibrillated materials consist of trunks and fibrils, but the trunks are successively branched. Thus, it is not always easy to distinguish the trunks and fibrils. Further, the sizes of the trunks and fibrils are distributed in a wide range, and these trunks and fibrils are bent in a creep or snake-like state and further slightly entangled with one another. They have at least one curving per 1-mm length or at least one circle per 2-mm length, and said curving or circle comprises further fine curving or circles.

The trunks and fibrils have, of course, sharp and angular broken surfaces.

Figure 4:
FIG. 4 is an enlarged plan view (sketched through a microscope) of one example of synthetic pulp obtained at two-stage fibrillation.
Figure 5:
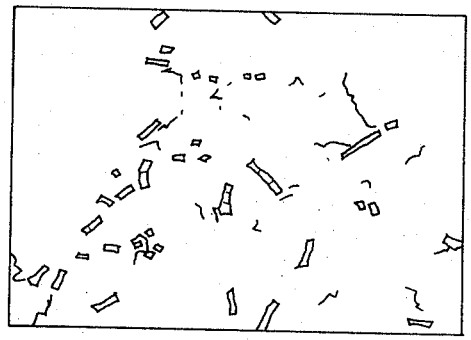
FIG. 5 is an enlarged, laterally cross-sectional view of the example in FIG. 4.

In FIGS. 4 and 5, the features of the present synthetic pulp obtained by two stage fibrillation are clearly shown.

It is seen from comparison of FIGS. 4 and 5 with FIGS. 6 to 9 that the present synthetic pulp is much distinguished in features, that is, even in the entire shape as well as the cross-sectional shape, from the conventional ones.

The present synthetic pulp has flat fiber surfaces and sharp and angular broken surfaces, and is composed of trunks and fibrils bent in a creep or snake-like form as in the cottom pulp. Further, the trunks and fibrils are highly entangled with one another. That is when papers are prepared from the present synthetic pulp, light weight, soft and bulky papers having a good permeability can be obtained, because of the high porosity and at the same time because their components are polypropylene and polyethylene of low density.

The trunks and fibrils are entangled with one another after the papers have been made, and there is almost no fluff at all on the paper surface. Furthermore, papers having a sufficient strength can be obtained even by using a small amount of a binder, because of the good entanglement of the trunks and fibrils.

From the present synthetic pulp alone, papers can be made, if the texture is a little sacrificed, but papers having a good texture can be obtained when papers are made from a blend further containing preferably 20% to 95% by weight of wood pulp.

As the paper-making method, the ordinary method for making papers can be almost applied as such. That is, the present synthetic pulp is blended, if necessary with wood pulp, etc., treated in a beater or pulper to disperse the pulp, and subjected to paper making by a Fourdrinier paper machine or Yankee paper machine, while diluting the pulp with a white water. The thus prepared paper is dried, and immersed in a solution of an adhesive.

The present synthetic pulp can be also blended, freely with other pulp-like fibers than the wood pulp.

As the fibers miscible with the present synthetic pulp, synthetic fibers, bast fibers, animal fibers, chemical fibers such as rayon, cellulose acetate, etc., inorganic fibers such as glass fibers, asbestos fibers, etc., or other fibers used in paper making can be widely used.

As the use of the papers prepared from the present synthetic pulp, a substrate for synthetic leather, resin-saturating paper, coating paper, heat-insulating material, sound-proofing material, cushioning material, padding, fancy paper, screen pater, bags and case materials, filter, map paper, etc. are mentioned.

EXAMPLE 1

A film having a thickness of $50\mu$ obtained by water-cooling inflation from 80 parts by weight of polypropylene having a MFR of 50 and 20 parts by weight of low density polyethylene having a MI of 2 was stretched in a heated air atmosphere at 130°C to 10 time the original length (thickness of the stretched film: about $17\mu$), and then cut to a length of 3 mm. Then, the thus obtained cut films were fibrillated using the fibrillating machine of the present invention under the following conditions:

| | |
|---|---|
| Inner diameter of the outer casing 1: | 400 mm |
| Outer diameter of the rotors 6' and 7': | 390 mm each |
| Length in the rotary shaft direction of 14 vanes provided with equal distances on the rotor: | 100 mm each |
| Length in the radial direction of the vanes: | 85 mm each |
| Thickness of the vanes: | 4.5 mm each |
| Distance between the projection 14 and the tip ends of the vanes 6' and 7': | 5 mm |
| Outer diameter of the disks 8, 9, 10 and 11: | 375 mm each |
| Distance between the disks 3 and 4: | 305 mm |
| Number of revolutions of the rotary shaft: | 4,800 r.p.m. |
| (Tip speed of the rotor: | about 100 m/sec.) |
| Air flow rate: | about 17 m³/min. |

Even at a feed rate of the materials of 45 kg/hr., fibrillated short fibers having 10 to 20 deniers on average could be obtained without any trouble on account of the melting thereof.

When the fibrillation was likewise repeated with once fibrillated material mentioned above, no trouble was encountered at a feed rate of 45 kg/hr or higher, and a pulp-like product having the characteristics $a \sim i$ as mentioned in connection with the objects of the present invention could be satisfactorily obtained.

The discharged air temperature was increased by about 20°C above the ambient temperature at the fibrillation. In order to abate the temperature increase, a suitable amount of water was supplied to the fibrillating zone through a small pipe connected to supplying inlet.

The synthetic pulp thus obtained was added to a slurry of bleached kraft pulp of soft wood (which will be hereinafter referred to as "NBKP") beaten to 200° to 300° of Canadian heating degree, so that the ratios by weight of the synthetic pulp to NBKP might be the specified ones. Furthermore, 10% by weight (based on the total weight of the synthetic pulp and NBKP) of polyvinyl alcohol fibers cut to a length of 3 mm was added thereto, and thoroughly blended, and the mixture was subjected to paper making to a paper thickness of 0.200 mm by the ordinary Fourdrinier paper machine. The blending ratios of the synthetic pulp to NBKP were the following four kinds: 0:100 parts by weight, 10:90 parts by weight, 30:70 parts by weight and 60:40 parts by weight.

For comparison, the ordinary spun polypropylene fibers (1.5 deniers × 5 mm) were subjected to paper making at the same blending ratios as above. The physical properties of the thus obtained papers are shown in table 1.

Table 1

| Fibers | Physical properties of papers | | | |
|---|---|---|---|---|
| | Basic weight (g/m$^2$) | Thickness (mm) | Rigidity* (mg) | Permeability** (sec.) |
| Wood pulp, 100 parts | 116 | 0.200 | 515 | 7 |
| Wood pulp: synthetic pulp | | | | |
| 90:10 | 69.4 | 0.202 | 154 | 1[244] |
| 70:30 | 46.0 | 0.197 | 48 | −[31] |
| 40:60 | 38.1 | 0.201 | 13 | −[11] |
| Wood pulp: spun polypropylene | | | | |
| 90:10 | 86.9 | 0.203 | 275 | 2[481] |
| 70:30 | 56.7 | 0.200 | 111 | −[77] |
| 40:60 | 40.7 | 0.203 | 35 | −[13] |

*Measured by Gurley stiffness tester
**Measured by Gurley permeability tester

The figures in parentheses were those obtained by the following specially devised apparatus, because the permeability could not be measured by the Gurley permeability tester. That is, the apparatus consisted of an outer cylinder filled with water over a definite level, and an inner cylinder having a weight of 2.916 g and total capacity of about 12 L, the inner cylinder being freely slidable vertically within the outer cylinder. The lower end of the inner cylinder was an open end, through which water was freely passed in or out. At the upper end of the inner cylinder, a circular opening having a diameter of 300 mm was provided to fix a test paper piece. The measurement was carried out in the following manner: The apparatus was placed on a level, and the inner cylinder was pulled upwards. A test paper piece was fixed to the opening at the upper end of the inner cylinder, and gently left onto water to make the inner cylinder float in water. A time (sec.) required for passage of 2 L of air was measured by scales on the cylinder at the ordinary temperature under the atmospheric pressure.

It is seen from Table 1 that the papers prepared according to the present invention had very small basic weight, rigidity and permeability at each blending ratio with the pulp, as compared with the papers having the same thicknesses, which were prepared from the blends with the ordinary spun polypropylene fibers in place of the present synthetic pulp and that the present papers had a light weight, good softness and excellent permeability.

Further, it was observed in the practice of the present example, that in the papers prepared according to the present invention, fibers were hard to be isolated and had a less tendency to float over water surface, and thus the fluffs on the paper surface were considerably less, as compared with the papers prepared from the blends with the spun polypropylene fibers in place of the present synthetic pulp.

EXAMPLE 2

A mixture of 40 parts by weight of polypropylene having a MFR of 120 and 40 parts by weight of polypropylene having a MFR of 8 (average MFR after the mixing being 31) was admixed with 20 parts by weight of low density polyethylene having a density of 0.92 and a MI of 1.5, and the resulting mixture was extruded into a film having a thickness of 60μ from a T-die using the ordinary extruder. The film was stretched in an air atmosphere at 140°C to 9 times the original length, and then cut to a length of 2 mm. The cut films were twice fibrillated at a feed rate of 25 kg/hr and 5000 r.p.m. in the same apparatus as used in example 1. The thus obtained fibrillated materials showed similar shapes and properties to those of the fibrillation example except that they had a little coarse feeling.

The filbrillated materials were mixed into NBKP beated by the beater fibrillated a mixing ratio of the former to the latter of 50:50, and beated in a beater in the presence of a small amount of polyethylene lauryl ether, and papers having a basic weight of 115 g/m$^2$ was made by a Tappi standard sheet machine.

The thus obtained papers had a light weight, good softness and excellent permeability, as well as a good texture. As compared with the papers prepared from a blend with the ordinary spun polypropylene fibers, the surface had much less fluffs and excellent smoothness, and clear printing by gravure printing and screen printing was possible.

EXAMPLE 3

A mixture of 85 parts by weight of polypropylene having a MFR of 60 and 15 parts by weight of the same low density polyethylene as described in Example 2 was made into a film having a thickness of 45μ by air-cooling inflation system. The film was stretched to 10 times the original length, while sliding it over a hot plate heated to 120°C, and then cut to a length of 3 mm. The cut films were fibrillated by means of two fibrillating machines connected in series and each having a casing of inner diameter of 800 mm and each having the a similar structure to that described in Example 1. The clearance between the inner peripheral surface of the outer casing and the tip end of the rotor was 5 mm, and the speed at the tip end of the rotor was 102 m/sec. The air discharge rate was 30 m$^3$/min. and the feed rate of materials was 110 kg/hr. The thus obtained synthetic pulp was substantially same as described in Example 1. The synthetic pulp, NBKP and 1.5 denier viscose rayon cut to 5 mm were blended in ratios by weight of 10:90:0, 10:80:10, 30:70:0, 40:40:20 and 60:40:0, and each blend was thoroughly stirred in water and subjected to paper making with a basic weight of 110 g by a Tappi standard sheet machine. For comparison, papers were made from the similar blends with the spun polypropylene fibers in place of the present synthetic pulp. The results are shown in Table 2.

Table 2

| Fibers | Basic weight (g/m2) | Thickness (mm) | Density (g/cm$^3$) |
|---|---|---|---|
| Wood pulp:100 parts | 110 | 0.194 | 0.57 |
| Wood pulp:synthetic pulp:rayon | | | |
| 90:10:0 | 107 | 0.262 | 0.41 |
| 80:10:10 | 112 | 0.293 | 0.38 |

Table 2-Continued

| Fibers | Basic weight (g/m2) | Thickness (mm) | Density (g/cm³) |
|---|---|---|---|
| 70:30:0 | 110 | 0.378 | 0.29 |
| 40:40:20 | 109 | 0.494 | 0.22 |
| 40:60:0 | 117 | 0.615 | 0.19 |
| Wood pulp:spun polypropylene:rayon | | | |
| 90:10:0 | 111 | 0.241 | 0.46 |
| 80:10:10 | 112 | 0.288 | 0.39 |
| 70:30:0 | 109 | 0.354 | 0.31 |
| 40:40:20 | 110 | 0.441 | 0.25 |
| 40:60:0 | 114 | 0.527 | 0.22 |

It is seen from Table 2 that in the papers made from the blend containing the synthetic pulp and from that containing the spun polypropylene in the same blending ratio, the former paper based on the use of the synthetic pulp has a superior thickness or density at the same basic weight, that is, bulkiness, to the latter paper based on the use of the spun polypropylene. This has the same tendency as that of Example 1 (thickness/basic weight) and it is seen that these properties are not changed, even if other fibers than wood pulp are blended with the synthetic pulp.

As compared with the case using the conventional spun synthetic fibers, it was observed in the practice of the present example that the present synthetic pulp had a good ability to make papers, and fibers of the thus obtained papers were hard to be isolated, and had much less tendency to float on water surface, and further that fluffs on the paper surface were much less.

EXAMPLE 4

Two fibrillating machines each same as in Example 1 and arranged in series were used. Fibrillation was carried out under the following conditions, while a dilute aqueous solution of surfactant was fed at the inlet 15 for supplying raw material to be fibrillated: Material to be fibrillated: product obtained by preparing a water-cooling inflation film having a thickness of $50\mu$ from a mixture of 80 parts of polypropylene having a MFR of 50 and 20 parts of low density polyethylene having a MI of 2; stretching the resulting film to 10 times at 150°C in the heated atmosphere to give a film having a thickness of about $17\mu$; and cutting the film thus stretched into cut material having a length of 3 mm.

| | |
|---|---|
| Amount of cut material (material to be fibrillated) fed: | 50 Kg/Hr |
| Amount of dilute solution of surfactant fed: | 9 l/Hr |
| (Surfactant used: | sodium salt of dioctyl sulfosuccinate; its concentration: 1.7% by weight) |
| Number of revolutions of rotors: | First fibrillating machine, 5,000 r.p.m. Second fibrillating machine, 4,800 r.p.m. |
| Amount of air: | First fibrillating machine, 17 m³/min. Second fibrillating machine, 14 m³/min. |

Synthetic pulps obtained by fibrillation in the first fibrillating machine had an average denier of 20, and the final product obtained by fibrillation in the second fibrillating machine had a highly fibrillated and crimped and/or snake-like structure having an average denier of 10. Substantially no powders were found therein, and also, no small twisted materials nor molten small particles were observed. These synthetic pulp materials contained 1.1% by weight of water and 0.2% by weight of surfactant. When one grasp of them were thrown into water, it was observed that they sank instantaneously into water.

60 parts by weight of synthetic pulp thus obtained and 40 parts by weight of wood pulp having a Canadian beating degree of 300° obtained from needle-leaf trees were mixed in water containing 0.1% by weight of a copolymer of propylene oxide and ethylene oxide by means of a pulper, and subjected to paper making by means of a Yankee paper machine to give a paper having a basic weight of 83 g. The thus obtained papers had an extremely uniform texture.

What is claimed is:

1. An apparatus for fibrillating synthetic resin film into synthetic pulp which comprises in combination:
   A. a cylindrical outer casing having
      a. an inlet on one side for supplying air and materials to be fibrillated,
      b. an outlet on the other side for discharging an air stream containing fibrillated materials,
      c. a plurality of linear projections disposed along the inner peripheral surface of said casing in an alignment which is substantially parallel to the center line of said casing,
   B. a rotary shaft extending centrally through said casing and which is capable of being revolved at high speed around the center line of said casing,
   C. at least two rotors affixed to said shaft
      a. each rotor comprising a disk fixed perpendicularly to said rotary shaft and a plurality of spaced apart vanes fixed to the outer periphery of said disk which extend radially outward to within a very short distance of the inner longitudinal edges of said plurality of linear projections,
   D. pairs of circular plates fixed to said rotary shaft in such a way that each of said pairs supports a rotor therebetween,
   E. means adjacent said inlet for sucking in air and the materials to be fibrillated and discharging the air stream containing the fibrillated materials, said means comprising a disk fixed perpendicularly to said rotary shaft, and having a plurality of vanes provided thereon,
   F. the circular plates of adjacent rotors being spaced apart so as to leave a substantially unobstructed space between adjacent rotors.

2. An apparatus according to claim 1, wherein said rotors are revolved at a speed of 92 – 110 m/second.

3. An apparatus according to claim 1, wherein said very short distance between the tips of said vanes and said linear projections of said outer casing is in a range of 4 to 6 mm.

* * * * *